3,027,776
TRANSMISSION CONTROL VALVE
Kenneth E. Snyder, Northville, Mich., assignor to General Motors Corporation, Detroit, Mich., a corporation of Delaware
Filed July 29, 1957, Ser. No. 674,762
12 Claims. (Cl. 74—472)

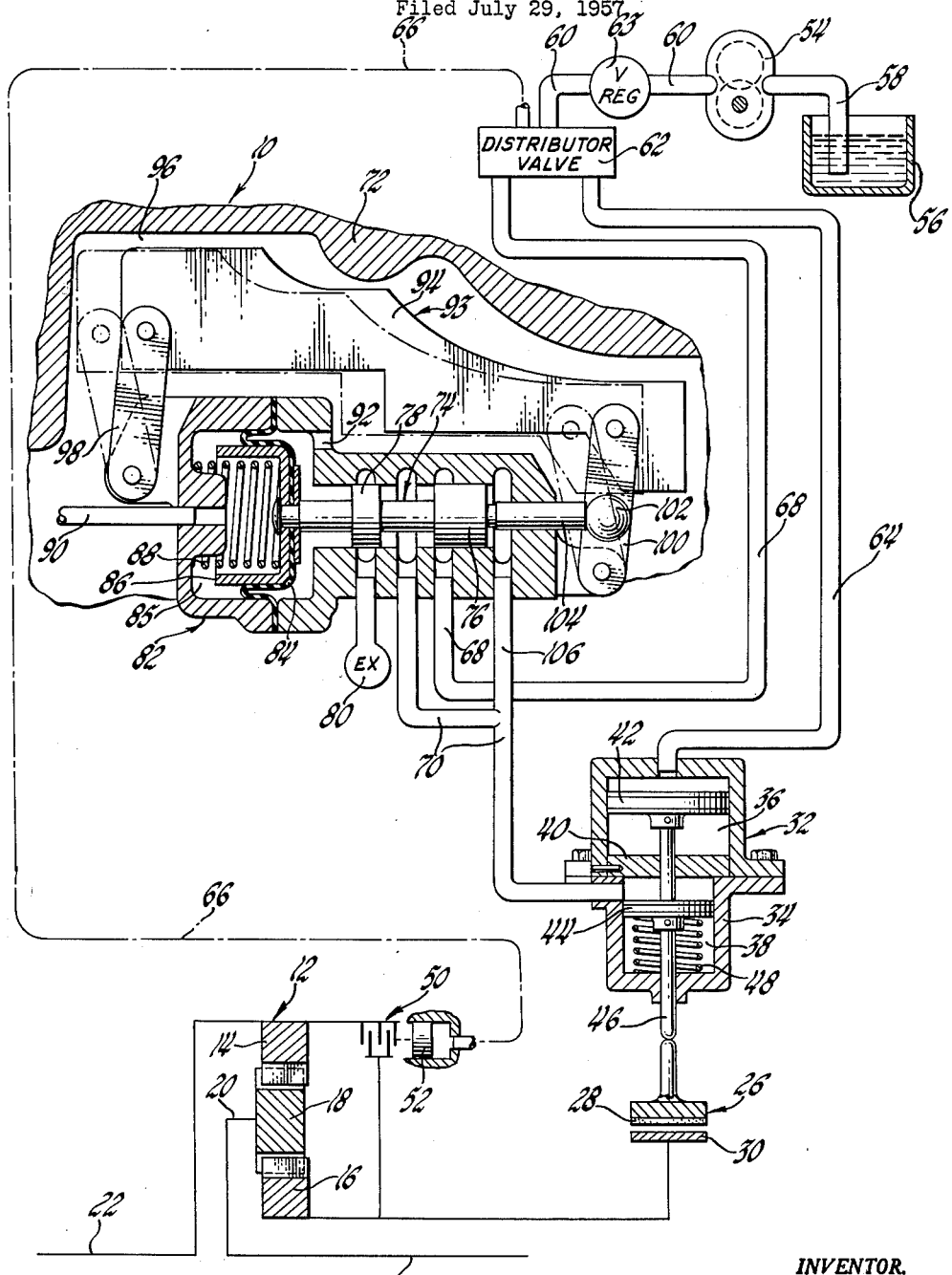

This invention relates to control devices and particularly to control devices for fluid pressure.

Frequently for various reasons, it is desirable that changes in motion, i.e., acceleration and deceleration, of a body occur smoothly. One such instance arises with automatic vehicle transmissions, especially of the planetary gear type, in which one of the planetary gear set members is held to obtain a reduced drive through the gear set or two of the gear set members are locked together for a direct drive. For a change in speed ratio in this type transmission to take place properly, the device controlling the planetary gearing must operate in such a manner that, despite engine loads, changes are gradual but positive without any sensation of "slipping". To demonstrate further with a brake band or a clutch as an example, if either the band or the clutch is engaged too rapidly in producing an upshift of the transmission, then acceleration is too quick causing the vehicle to lunge forward and produce a jerky or abrupt shift.

With this problem in mind, the invention seeks broadly to provide a control device for developing a pressure that reflects changes in motion of a body on which the device is installed.

More particularly, the invention contemplates a regulating valve means and an acceleration responsive means which together produce a pressure that varies with acceleration changes.

Another purpose of the invention is to combine a control device according to the foregoing objective, i.e. one that develops a pressure reflective of acceleration changes, with a speed ratio change mechanism for a vehicle transmission. By so controlling operation of the mechanism, smooth transitions from one speed ratio to another are obtained.

Also, a consideration is the provision by the invention of a control device that produces a pressure which is representative of both changes in acceleration and deceleration of a vehicle and the torque load on the vehicle engine. This representative pressure is then utilized to control speed ratio changes of the vehicle transmission, hence effecting smooth shifts.

In carrying out the invention, a control valve is installed in a transmission control system between a source of fluid pressure and a hydraulically operated mechanism. A weighted member, sensitive to motion of the vehicle, and a pressure operated control motor, exposed to pressure from the intake manifold, both coact with the control valve to develop a regulated pressure for transferal to a hydraulically operated mechanism. In this manner operation of the hydraulically operated mechanism is controlled, since it is combined with the transmission planetary gearing, to generate smooth ratio changes.

The foregoing and other objects and advantages will be apparent from the following description and from the accompanying drawing in which a transmission control system embodying the invention is depicted schematically.

Referring to the drawing, a control device, designated generally at 10, embodying the principles of the invention is demonstrated in a control system for a transmission. The transmission utilizes planetary gearing, shown diagrammatically at 12, comprising a ring gear 14 and a reaction sun gear 16, both of which mesh with a series of planet pinions 18 journaled on a planet carrier 20. The ring gear 14 is connected to an input shaft 22 while the carrier 20 is connected to an output shaft 24. Other units of planetary gearing may, of course, be combined with the gear set 12 to make available as many different speed ratios as desired.

For preventing rotation of the reaction gear 16, a brake mechanism 26 is employed which consists of a brake band 28 arranged to frictionally engage a drum 30 connected to the sun gear 16.

The brake mechanism 26 is actuated by a hydraulically operated servomotor 32 that includes a stepped cylindrical body 34. The cylindrical body 34 is divided into upper and lower compartments 36 and 38 by a separator 40 which prevents fluid pressure communication between these compartments. Slidable in the upper compartment 36 is a large piston 42 and in the lower compartment 38 a small piston 44. Each of the pistons 42 and 44 is attached to a piston rod 46 which extends from the cylindrical body 34 into engagement with the brake band 28 and both are urged upwardly together by a spring 48 to a brake band disengaged position.

When the servomotor 32 is actuated by fluid pressure, the reaction sun gear 16 is restrained from rotation whereupon drive from the input shaft 22 in a forward direction will cause the carrier 20 to rotate forwardly at a reduced rate determined by the ratio of the gear set 12.

If a direct drive through the gearing 12 is wanted, then a clutch 50 installed between the ring gear 14 and the sun gear 16 may be engaged by a hydraulically operated piston 52. Engagement of the clutch 50 prevents relative rotation between two elements of the gearing and, consequently, the entire gear set will rotate as a unit.

Pressure fluid for operating the servomotor 32 and the clutch 50 is furnished by a pump 54 which draws fluid from a sump 56 through a suction line 58 and discharges into a supply line 60 connected to a distributor valve 62. A conventional pressure establishing valve 63 is installed in the supply line 60 to establish the desired operating pressure for the system. Distributor valve 62 may be of any well known construction and either manually or automatically operated to selectively transfer pressure fluid from line 60 to a servomotor supply line 64 in communication with the upper compartment 36 of the servomotor 32 or to a clutch supply line 66 in communication with the piston 52 for clutch 50. In this system preferably fluid pressure is simultaneously supplied by the distributor valve 62 to line 64 and to a supply line 68 for the control device 10. As will be described, fluid pressure is regulated by control device 10 and discharged into a regulated pressure supply line 70 in communication with the lower compartment 38 of the servomotor 32.

The control device 10 includes a valve body 72 attached to the transmission for convenient access to the output pressure of the pump 54. Slidable in a bore in the valve body 72 is a control valve 74 having spaced lands 76 and 78. With the control valve 74 in the regulating position depicted, land 76 is positioned adjacent a port connected to the supply line 68 and the land 78 is opposite an exhaust port 80. In the system illustrated, the device 10 controls the servomotor 32 for the brake mechanism 26; however, the device 10 may also be used to control a similar motor for the clutch 50.

At the left side of the control valve 74, a pressure operated control motor 82 is mounted comprising a flexible member 84 which defines a chamber 85. Both the flexible member 84 and a cup shaped member 86 are secured to the left end of the control valve 74. A spring 88 is partially enclosed by the cup shaped member 86 and biases the valve 74 along with the flexible member 84 to the right. Chamber 85 is in communication through a conduit 90 with an engine intake manifold (not shown) while the side of the motor 82 opposite chamber 85 and flexible member 84 is open to atmosphere through a vent 92.

Also, coacting with control motor 82 to exert an influence on the control valve 74 is an acceleration responsive or inertia operated device 93 that utilizes an irregularly shaped weighted member 94. The weighted member 94 is housed within a pocket 96 in the body 72 and is supported at opposite ends for swinging movement relative to body 72 by a pair of links 98 and 100. By means of a projection 102 on link 100, movements of the weighted member 94 can be transferred to the control valve 74 through the engagement of the projection 102 with a stem portion 104 of the valve. The disposition of the weighted member 94 is such that it is aligned or parallel with the vehicle horizontal axis extending from the front to the rear of the vehicle with the end connected to link 100 towards the front so as to be sensitive to accelerating movements of the vehicle on which the valve body is installed. In other words, if the vehicle is proceeding forward at a constant speed, the weighted member 94 will be in the full line position shown, but, if the vehicle speeds up too quickly or abruptly, then the weighted member 94 will swing to the dotted line position which corresponds to the rear of the vehicle.

In operation, with the influence of the weighted member 94 and intake manifold pressure in the conduit 90 eliminated, the control valve 74 in the position demonstrated will, in a manner well known, regulate pressure at a value determined by the spring 88. Briefly, the spring 88 will move the valve 74 to the right until land 76 partially opens the port connected to line 68 whereupon fluid pressure in the line 68 will be transferred to a port connected to the supply line 70 and then through a branch line 106 to the right end area of land 76. Fluid pressure acting on this end area will move the valve 74 to the left so that land 76 interrupts communication with the line 68 and land 78 opens slightly the exhaust port 80. Pressure in the line 70 will be reduced to a degree that enables the spring force to reopen the port connected to supply line 68 and again increase the fluid pressure in lines 70 and 106. This regulating procedure continues and as mentioned the pressure developed will be determined by the biasing effect of the spring 88.

In considering the operation of the control motor 82, assume first that the pressure in the intake manifold is at a maximum, as with the engine idling, the vacuum created will draw the flexible member 84 to the left in opposition to the spring 88 and reduce some of the spring bias exerted on the control valve 74. As a result, land 76 will close the port connected to the line 68 and pressure in the line 70 will become either zero or a minimum. Next, assume that the engine is operating at full throttle, i.e., with a wide open throttle, manifold pressure diminishes and, accordingly, a maximum regulated pressure is developed by the control valve 74 closely approximating that determined by the bias force of the spring 88.

With the foregoing two extreme operating conditions in mind, it can be seen that with light throttle operation and with the distributor valve 62 opened to supply fluid pressure to both the control device 10 and the servomotor 32, the only pressure acting on the motor 32 will be that in the line 64 since the pressure in line 70 will be negligible. This pressure in line 64 will act on the upper face of the piston 42 and urge it downwardly to engage brake band 28 with the drum 30, hence a reduced drive through the transmission is effected. With full throttle operation, pressure in the line 70 is a maximum so that an additional force is obtained by the action of this line 70 pressure on the upper face of the small piston 44 and a quicker engagement of the brake mechanism 26 will result.

Now, should the brake mechanism 26 start to engage too abruptly during an upshift, the acceleration responsive device 93 becomes effective and because the vehicle tends to lunge or lurch forwards, the weighted member 94 will move rearwardly. As a consequence, the projection 102 will engage the stem portion 104 and move the control valve 74 in a direction which decreases the pressure in the line 70, thereby slowing up engagement of the brake mechanism 26 sufficiently to remove some of the abruptness from the shift. On the other hand, when the brake mechanism 26 engages too slowly, the drive connection is interrupted long enough to permit the vehicle to slow down whereupon the weighted member will move forwardly allowing the engaging pressure to increase and speed up the engagement. If the shift is proper, the weighted member 94 will not shift rearwardly sufficient to reduce the pressure in the line 70. By this construction, both engine loads and vehicle acceleration are factors in controlling shifts. During full throttle shifts additional hydraulic force is furnished through the influence of the control motor 82 to accommodate the increased engine torque, but, if the shift becomes too harsh or sudden, this hydraulic force is quickly reduced by the acceleration responsive device 93. Similarly, with lighter throttle shifts, because the engine torque is reduced the additional hydraulic force provided by the operation of the control motor 82 becomes less. However, again, if the shift becomes jerky, the acceleration responsive device will reduce the hydraulic force.

To a limited extent the device 10 does sense deceleration, but, if the deceleration is extreme, the projection 102 will be moved away from the valve stem portion 104 and the device 10 will become incapable of affording a deceleration conscious force.

If it is desired to control both downshifts and upshifts then another device like control device 10 may be installed in the opposite direction, i.e., with the end connected to the link 100 towards the rear of the vehicle. With the device reversed, if the band or clutch to be controlled is engaged too quickly during a downshift, the weighted member will move forwards and reduce the engaging pressure so as to slow up the engagement in a manner previously described.

I claim:

1. A control device for fluid pressure from a first source comprising, in combination, valve means for regulating the fluid pressure from the first source, acceleration responsive means and pressure operated means, a second source of fluid pressure for the pressure operated means, both the acceleration responsive means and the pressure operated means coacting with the valve means for varying the regulation by the valve means.

2. A control device for fluid pressure from a first source comprising, in combination, a control valve for regulating the fluid pressure from the first source, motion responsive means associated with the control valve, a second source of fluid pressure, and a chamber including a movable member associated with the control valve, the movable member being exposed to the fluid pressure from the second source, the motion responsive means and the movable member both coacting with the control valve for varying the regulation by the control valve.

3. A control device for fluid pressure from a first source arranged for installation on a movable body comprising, in combination, a control valve for regulating continuously the fluid pressure, a weighted member joined to the movable body so arranged as to sense changes in acceleration and deceleration of the movable body, means responsive to movements of the weighted member for altering the regulating operation of the control valve, a second source of fluid pressure, and a chamber including a movable member, the movable member being exposed to the fluid pressure from the second source, the weighted member and the movable member coacting with the control valve to vary the regulation by the control valve.

4. A control device for fluid pressure from a first source comprising, in combination, a movable valve body having a bore therein and including spaced inlet, outlet and relief passages opening into the bore, a control valve movable in the bore, a weighted member suspended on the movable valve body so as to sense changes in the acceleration and deceleration of the movable body, means responsive to movements of the weighted member for altering the control valve setting, a second source of fluid pressure, and a chamber including a flexible member, the flexible member being exposed to the fluid pressure from the second source, the control valve being movable between the inlet and relief passages by the coaction of the flexible member and the weighted member therewith to regulate continuously the fluid pressure from the first source in accordance with variations in the control pressure acting on the movable member and changes in acceleration and deceleration of the movable valve body sensed by the weighted member.

5. A control device for fluid pressure from a first source, comprising, in combination, a movable valve body having a bore therein and including spaced inlet, outlet and relief passages opening into the bore, a regulating chamber in the body, a passage interconnecting the outlet passage and the control chamber, a control valve movable in the bore and having a portion exposed to fluid pressure in the control chamber, a weighted member suspended on the valve body and arranged so as to cause the control valve to be urged in the decreasing pressure direction with an increase in acceleration of the movable valve body, a second source of fluid pressure, and a chamber including a flexible member, the flexible member being exposed to the fluid pressure from the second source for urging the control valve in an increasing pressure direction with an increase in the control pressure, the control valve being movable between the inlet and relief passages by the flexible member and the weighted member to regulate continuously the fluid pressure from the first source in accordance with variations in the control pressure and changes in acceleration and deceleration of the movable valve body.

6. In a transmission for a motor vehicle, gearing, hydraulically operated mechanisms for so conditioning the gearing as to establish a plurality of speed ratios, a source of fluid pressure, a distributor device for directing fluid pressure from the source to the mechanisms, valve means for regulating the fluid pressure, acceleration responsive means for detecting changes in linear acceleration and deceleration of the vehicle, and means for communicating the changes detected by the acceleration responsive means to the valve means so as to vary the regulation by the valve means in accordance with changes in the linear acceleration and deceleration of the vehicle thereby controlling the operation of one of the mechanisms.

7. In a transmission for a motor vehicle, gearing, hydraulically operated mechanisms for so conditioning the gearing as to establish a plurality of speed ratios, a source of fluid pressure, a distributor device for directing fluid pressure from the source to the mechanisms, valve means for regulating the fluid pressure, a source of control pressure, acceleration responsive means for detecting changes in linear acceleration and deceleration of the vehicle, means for communicating the changes detected by the acceleration responsive means to the valve means, and pressure operated means in communication with the source of control pressure, the acceleration responsive means and pressure operated means both coacting for varying the regulation by the valve means in accordance with variations in the control pressure and changes in the linear acceleration and deceleration of the vehicle so as to control the operation of one of the mechanisms.

8. In a transmission for a motor vehicle, gearing, hydraulically operated mechanisms for so conditioning the gearing as to establish a plurality of speed ratios, a source of fluid pressure, a control valve for regulating the fluid pressure, acceleration responsive means for detecting changes in linear acceleration and deceleration of the vehicle, means for communicating the changes detected by the acceleration responsive means to the control valve, a source of control pressure, and a chamber including a movable member operatively associated with the control valve and exposed to the control pressure, the acceleration responsive means and the movable member both coacting with the control valve to vary the regulation by the control valve in accordance with variations in the control pressure and changes in the linear acceleration and deceleration of the vehicle so as to control the operation of one of the mechanisms.

9. In a transmission for a motor vehicle, gearing, hydraulically operated mechanisms for so conditioning the gearing as to establish a plurality of speed ratios, a source of fluid pressure, a control valve for regulating the fluid pressure, a weighted member mounted on the vehicle so as to sense changes in linear acceleration and deceleration of the motor vehicle, means for communicating the changes sensed by the weighted member to the control valve, a source of control pressure, and a chamber including a movable member exposed to the control pressure, the weighted member and the movable member both coacting with the control valve for varying the regulation by the valve means in accordance with changes in the linear acceleration and deceleration of the vehicle and variations in the control pressure so as to control the operation of one of the mechanisms.

10. In a transmission for a vehicle having an engine with an intake manifold, gearing hydraulically operated mechanisms for so conditioning the gearing as to establish a plurality of speed ratios, a rource of fluid pressure, a control valve for regulating the fluid pressure, a weighted member mounted on the vehicle adjacent the control valve and so arranged as to sense and to cause changes in linear acceleration and deceleration to the vehicle to the control valve, and a chamber including a flexible member exposed to pressure in the intake manifold, the weighted member and the flexible member both coacting with the control valve for varying the regulation by the control valve in accordance with changes in the linear acceleration and deceleration of the vehicle and variations in the pressure in the intake manifold so as to control the operation of one of the mechanisms.

11. In a transmission for a vehicle having an engine with an intake manifold, planetary gearing comprising input, output and reaction elements, a brake for the reaction element, a hydraulically operated servomotor for engaging the brake with the reaction element, a source of fluid pressure, a control valve for regulating the fluid pressure supplied by the source to the servomotor for operating the brake and restraining rotation of the reaction element so as to provide a reduced drive through the gearing, a weighted member mounted on the vehicle adjacent the control valve and so arranged as to sense and to cause changes in linear acceleration and deceleration of the vehicle to the control valve, and a control chamber including a movable member exposed to pressure from the intake manifold, the weighted member and the movable member coacting with the control valve to vary the pressure developed by the control valve in accordance with changes in linear acceleration and deceleration of the vehicle and variations in the pressure from the intake manifold so as to control engagement of the brake.

12. In a transmission for a vehicle having an engine with an intake manifold, planetary gearing comprising input, output and reaction elements, a brake for the reaction element, a hydraulically operated servomotor for engaging the brake with the reaction element, the servomotor including first and second chambers, a source of fluid pressure, a distributor device for directing fluid pressure from the source to the first chamber of the servomotor for operating the brake and restraining rotation of the reaction element so as to provide a reduced drive through the gearing, a control valve interposed between the distributor device and the second chamber of the servomotor for regulating fluid pressure supplied to the second chamber of the servomotor, a weighted member mounted on the vehicle so as to sense changes in linear acceleration and deceleration of the vehicle, means for communicating the changes sensed by the weighted member to the control valve, and a control chamber including a movable member exposed to pressure from the intake manifold, the weighted member and the movable member coacting with the control valve to vary the pressure determined by the control valve in accordance with changes in the linear acceleration and deceleration of the vehicle and variations in pressure in the intake manifold so as to control the engagement of the brake.

References Cited in the file of this patent

UNITED STATES PATENTS

| | | |
|---|---|---|
| 2,011,243 | Griswold | Aug. 13, 1935 |
| 2,136,574 | Campbell | Nov. 15, 1938 |
| 2,595,969 | McFarland | May 6, 1952 |
| 2,609,905 | Thomas | Sept. 9, 1952 |
| 2,697,363 | Sheppard | Dec. 21, 1954 |
| 2,722,296 | Stoeckicht | Nov. 1, 1955 |
| 2,740,304 | Sheppard | Apr. 3, 1956 |
| 2,753,733 | Förster | July 10, 1956 |

UNITED STATES PATENT OFFICE
CERTIFICATE OF CORRECTION

Patent No. 3,027,776                        April 3, 1962

Kenneth E. Snyder

It is hereby certified that error appears in the above numbered patent requiring correction and that the said Letters Patent should read as corrected below.

In the heading to the drawings, line 2, and in the heading to the printed specification, line 2, title of invention, for "TRANSMISSION CONTROL VALVE", each occurrence, read -- TRANSMISSION CONTROL SYSTEM --; column 6, line 30, for "rource" -- read -- source --; line 34, for "to", first occurrence, read -- of --; column 8, line 12, strike out "2,753,733 Förster ----- July 10, 1956".

Signed and sealed this 24th day of July 1962.

(SEAL)
Attest:

ERNEST W. SWIDER
Attesting Officer

DAVID L. LADD
Commissioner of Patents